(12) United States Patent
Doser

(10) Patent No.: US 7,889,214 B2
(45) Date of Patent: Feb. 15, 2011

(54) SEQUENTIAL COLOUR DISPLAY DEVICE

(75) Inventor: Ingo Tobias Doser, Donaueschingen (DE)

(73) Assignee: Thomson Licensing, Boulogne-Billancourt (FR)

(*) Notice: Subject to any disclaimer, the term of this patent is extended or adjusted under 35 U.S.C. 154(b) by 646 days.

(21) Appl. No.: 11/666,327

(22) PCT Filed: Oct. 11, 2005

(86) PCT No.: PCT/EP2005/055165
§ 371 (c)(1),
(2), (4) Date: Mar. 10, 2008

(87) PCT Pub. No.: WO2006/045698
PCT Pub. Date: May 4, 2006

(65) Prior Publication Data
US 2008/0198179 A1     Aug. 21, 2008

(30) Foreign Application Priority Data
Oct. 27, 2004   (EP) .................................. 04025517

(51) Int. Cl.
*G09G 5/10* (2006.01)
(52) U.S. Cl. .................................................... 345/690
(58) Field of Classification Search .................. 345/84, 345/85, 690; 359/618; 348/743, 744
See application file for complete search history.

(56) References Cited

U.S. PATENT DOCUMENTS

| 5,633,755 | A | 5/1997 | Manabe et al. | |
|---|---|---|---|---|
| 5,812,303 | A * | 9/1998 | Hewlett et al. | 359/298 |
| 6,324,006 | B1 * | 11/2001 | Morgan | 359/618 |
| 6,445,505 | B1 | 9/2002 | Morgan | |
| 6,567,134 | B1 | 5/2003 | Morgan | |
| 7,646,368 | B2 * | 1/2010 | Roth et al. | 345/84 |
| 2002/0008712 | A1 | 1/2002 | Shigeta | |
| 2003/0185010 | A1 | 10/2003 | Hewlett et al. | |
| 2005/0168454 | A1 * | 8/2005 | Bellis et al. | 345/204 |

FOREIGN PATENT DOCUMENTS

WO   WO 2005/019909   3/2005

OTHER PUBLICATIONS

Search Report Dated Nov. 25, 2005.

* cited by examiner

*Primary Examiner*—Amare Mengistu
*Assistant Examiner*—Steven E Holton
(74) *Attorney, Agent, or Firm*—Robert D. Shedd; Jeffrey M. Navon

(57) ABSTRACT

A display device produces color images by sequentially projecting monochromatic images. Multispectral light is projected via optical means and a filter arrangement with changeable primary color filters onto an imaging device. For each primary color the imaging device produces a number of constant-length pulses corresponding to a desired brightness level. The pulse length is chosen to be as short as possible for a first primary color. The pulse length for the other primary colors is adapted according to the respective share of the corresponding color filters in the color wheel. The time during which secondary colors are produced due to a transition between two primary color filters is increased by increasing the aperture of the optical means, by spatially relocating the focal point of the optical means for a disc-like filter arrangement, or by accordingly adding pure color light at the onset and the end of a transition between two color filter segments which produces secondary color light. Secondary color light is used to increase the brightness of the projected image.

5 Claims, 3 Drawing Sheets

SEQUENTIAL COLOUR DISPLAY DEVICE

This application claims the benefit, under 35 U.S.C. §365 of International Application PCT/EP2005/055165, filed Oct. 11, 2005, which was published in accordance with PCT Article 21(2) on May 4, 2006 in English and which claims the benefit of European patent application No. 04025517.6, filed Oct. 27, 2004.

The invention relates to a display device which reproduces multi-colour images by sequentially displaying monochromatic images.

In sequential colour display systems of the above-mentioned type a colour sequence is created by a rotating wheel or disc having colour filter segments of different single colours. The images of different single colours are displayed successively and the human visual system integrates the displayed images to one image showing a multiplicity of compound colours. The resulting image is in the following referred to as multi-colour image or full colour image. For additive colour mixing the colours used are preferably the primary colours red, green and blue. The single colour images are reproduced by projecting multispectral, essentially white light through the rotating colour wheel onto an imaging device, e.g. a DLP or 'Digital Light Processing' device. The imaging device may appear in the form of a DMD or 'Digital Micromirror Device', but other types of imaging devices exist, e.g. GLV, which is an acronym for 'Grating Light Valve', or LCOS, an acronym for 'Liquid Crystal On Silicon' systems, or even LCD, or 'Liquid Crystal Display'. The imaging device typically comprises individual pixels that are arranged in rows and columns. The number of pixels in the rows and columns determine the spatial resolution of the imaging device. The projected monochromatic light is either reflected or transmitted by the imaging device onto a screen for viewing, depending on the type of imaging device used. The image content determines the amount of light transferred to the screen for each pixel and colour.

If, for example, similar amounts of red, green and blue light are displayed in fast sequence, the eye perceives white coloured light. In the following the term 'amount' of light will be used interchangeable with 'intensity' or 'brightness' of light, or an integration of light over periods of time, unless otherwise noted. Additive colour mixing as described above requires a rate of change of the colours that is above an observer's eye's capability to discern individual images.

An n-segment Colour Wheel has n individual colour filter segments, each separated from the other. The boundary between two segments is referred to as 'spoke'. Special treatment is required when such a spoke enters into the light path: The light is not concentrated in a very small light spot which has virtually no diameter, but it is a light beam with a rather large aperture. During a certain period of time when crossing the boundary between two segments the light spot illuminates two segments of the colour wheel at the same time. The light has thus no longer one specific primary colour, it is now a mixture between the respective two adjacent colours. This mixture is referred to as secondary colour. The secondary colours for a colour wheel having the primary colours red, green and blue are magenta, cyan and yellow. Since the secondary colours differ from the primary colour it is necessary to differentiate between 'spoke light' and 'non-spoke light'. As shown in FIG. 1, there are actually twelve different colour areas on a six-segment colour wheel: A first Magenta spoke SM1, then a first blue segment B1, then a first Cyan spoke SC1, then a green segment G1, and so on. Non-spoke light is of a pure primary colour.

As can be seen in FIG. 2 the primary colours red, green and blue are defined by their positions x and y in the 1931 C.I.E. diagram. The primary colours of the colour wheel are determined by selecting appropriate segment filter materials and densities. The secondary colours, however, are not located at fixed positions in the 1931 CIE diagram. During the time when the spoke passes the light spot the secondary colour point travels from the position of one primary colour to the position of the subsequent primary colour. The 1931 C.I.E. diagram in FIG. 2 shows a 'CYAN spoke point', a 'YELLOW spoke point' and a 'MAGENTA spoke point'. These points represent the cumulative colour coordinate of the spoke colour. The white point is indicated by the oval designated 'W'.

Due to the properties of spoke light mentioned above conventional display systems often discard the spoke light, thus achieving a useful brightness that is below the maximum possible brightness for the display system. The actual time during which each individual spoke is determining the colour of the projected light is determined by optical and electrical factors like, for example, the aperture of the light path and light modulation originating from pulsing the lamp which is used to illuminate the colour wheel, but also by the rotational speed of the colour wheel. In FIG. 1 the aperture AP is shown as a white circular spot. The width of the spoke equals twice the diameter of AP, since the secondary colours are created as soon as a part of the circular spot AP covers the adjacent filter segment. The actual border between the filter segments is located central of the spoke segments. The constant angular speed of the colour wheel is indicated by the arrow $\omega$. In an exemplary display system each individual spoke covers 10° of the colour wheel. For six spokes this results in 60° of spoke light per full revolution of the colour wheel. Thus spoke light is present during almost 60°/360°=17% of the total time, or, in other words, only 83% of the light from the light source is actually used.

Further variations in brightness of the display system may result from light modulation by lamp sync pulses etc. However, throughout this specification these further losses are neglected for the sake of clarity.

Some known display systems use spoke light, or secondary colour light, to increase the total brightness of the image, particularly for images that have a relatively high amount of white image content. E.g., U.S. Pat. No. 5,592,188 discloses increasing contrast and dynamic range by using secondary colour light. The present invention is an improvement over the known system.

Colour wheels of common display systems often do not have equal-sized segments. Amongst the reasons for this are, for example, the availability of the desired filter density, the spectral distribution of the light source and the spectral distribution of the observer's eye's sensitivity. In the following, an exemplary display system is described, the properties of which are adhered to throughout this specification unless otherwise noted. In the exemplary display system a six-segment colour wheel has two equal segments of each individual primary colour. The blue segments each cover an angle of $\phi_{BLUE}=60°$, the green segments each cover an angle of $\phi GREEN=50°$, and the red segments each cover an angle of $\phi_{RED}=70°$ of the colour wheel. Further, an optical system of the exemplary display system allows an angle for the spokes to be as small as $\phi_{SPOKE}=10°$. As mentioned above, the minimum spoke size is determined by the size of the aperture in relation to the size of the colour wheel. The spoke is located symmetrically to the segment boundary, i.e., at the red-blue boundary, half of $\phi_{SPOKE}$ will be on the red side and the other half on the blue side. The same applies to the other boundaries. Consequently, a six segment colour wheel has six spokes. Hence, the angle during which a pure primary colour is reproduced during one full turn of the wheel calculates as $$\varphi_{PURE,COLOR\_X} = 2 \cdot \left(\varphi_{SEGMENT,COLOR\_X} - \frac{\varphi_{SPOKE}}{2} - \frac{\varphi_{SPOKE}}{2}\right) \quad (1)$$
$$= 2 \cdot (\varphi_{SEGMENT,COLOR\_X} - \varphi_{SEGMENT,COLOR\_X} - \varphi_{SPOKE})$$

For the assumed exemplary colour wheel this results in angles of $$\varphi_{PURE,GREEN} = 2 \cdot (\varphi_{SEGMENT,GREEN} - \varphi_{SPOKE}) = 2 \cdot (50° - 10°) = 80° \quad (2)$$

$$\varphi_{PURE,BLUE} = 2 \cdot (\varphi_{SEGMENT,BLUE} - \varphi_{SPOKE}) = 2 \cdot (60° - 10°) = 100° \quad (3)$$

$$\varphi_{PURE,RED} = 2 \cdot (\varphi_{SEGMENT,RED} - \varphi_{SPOKE}) = 2 \cdot (70° - 10°) = 120° \quad (4)$$

which are useful for reproducing the respective primary colours only. The exemplary display system further has a fixed frame frequency $f_v$, thus the time $t_{PURE,COLOR}$ during which a pure primary colour is reproduced calculates as follows:

$$t_{PURE,COLOR\_X} = N \cdot \frac{\varphi_{PURE,COLOR\_X}}{360°} \cdot \frac{1}{f_v} \quad (5)$$

wherein N is the number of equal coloured segments in the colour wheel. In the example N=2 is assumed. For an image frequency of $f_v=50$ Hz the times during which pure primary colours are reproduced by equal-coloured segments of the colour wheel are:

$$t_{PURE,GREEN} = 2 * \frac{40°}{360°} * \frac{1}{50\frac{1}{s}} = 4.444 \text{ m sec} \quad (6)$$

$$t_{PURE,BLUE} = 2 * \frac{50°}{360°} * \frac{1}{50\frac{1}{s}} = 5.556 \text{ m sec} \quad (7)$$

$$t_{PURE,RED} = 2 * \frac{60°}{360°} * \frac{1}{50\frac{1}{s}} = 6.667 \text{ m sec} \quad (8)$$

As discussed before, during the time in which the light spot crosses the boundary between two primary colour segments the display system produces secondary colours, i.e. a mixture of two primary colours. As can be seen in the 1931 C.I.E colour diagram shown in FIG. 2, spoke light only allows for reproducing fewer colours than non-spoke light. The triangle that is delimited by the solid lines connecting the pure primary colour points for red, green and blue includes the colours that can be produced by appropriately mixing the primary colours. The triangle that is delimited by the dashed lines connecting the secondary colour points for yellow, magenta and cyan includes the colours that may be produced by mixing the secondary colours. Both triangles include the white centre point W of the colour diagram. Since the secondary colours may not be used for producing the same colour gamut as the primary colours, using spoke light is more or less restricted to a particular purpose, which is boosting the total brightness of the image content, also referred to as white boosting. White boosting may have the adverse effect, depending of the implementation, that colour saturation of the picture content is sacrificed for the sake of an increased contrast ratio. Still, this may be a preferred use, since the contrast of a display is a parameter of great importance. The contrast of a display is the ratio between the maximum brightness that can be achieved and the smallest non-zero brightness level that can be displayed. The contrast is also referred to as dynamic range.

The driving scheme for controlling the imaging device is adapted to use the respective available time during which each pure primary colour is available for composing the full colour image. Digital imaging devices are controlled in a pulse width modulation manner. The pixels of the imaging devices are either on or off, i.e., light is projected or not. In order to display brightness levels different from fully on or fully off, i.e. bright or dark, the pixels are periodically turned off or on at a frequency that is high enough so that the human visual system does not perceive the occurrence of individual switching processes. Instead, the human visual system integrates the switched light pulses into an average brightness. Discrete brightness levels are determined by pulses of different width, or length when speaking in terms of time. If, for example, an imaging device has 8 bit brightness resolution, this means that light pulses that sum up to 255 individual LSB length pulses are arranged within the area of the colour wheel which allows for pure primary colour to be reproduced. The shortest possible pulse length corresponds to the least significant bit, or 1 LSB. The LSB pulse length is the time during which the respective pure primary colour is reproduced divided by the maximum number of pulses according to the brightness resolution of the imaging device. Since a primary colour segment shall be used to a maximum extent and the individual colour segments may have different sizes the time for one single pulse, i.e., the time for one LSB length pulse, depends on the respective primary colour that is reproduced. The terms "resolution" and "brightness resolution" are used interchangeably throughout this specification. When referring to the "spatial resolution" of the imaging device, this is explicitly indicated. As an example, a brightness level of 128 in an 8-Bit system is obtained by lighting the pixel of the display 128/256=½ of the total time in a picture period. A picture period is a frame or a field in systems that reproduce images in a progressive or interlaced manner. To constitute the pulse of the desired length the display may use a sequence of 128 equal-length individual light pulses, or one continuous light pulse with the same total length as 128 equal-length individual light pulses. It is also possible to use any other combination of pulses of different length which eventually adds up to the desired sum, in the example 128. The different pulse lengths are also referred to as bit weights, as the pulses "weigh" as much as a corresponding number of the shortest pulse that can be reproduced. The light pulses may be, as explained above, equal-length light pulses or a combination of light pulses of different length, the sum of which equals 255.

The driving scheme of the imaging device arranges the LSB pulses into a set of subfields. Subfields are light pulses the duration, or weight, of which equals a predetermined number of LSB pulses. During a field for interlaced display or a frame for progressive display of an image those subfields are selected for display whose added weight equals the desired brightness level. An exemplary subfield pattern is shown in FIG. 3. The length of the pulses in terms of LSBs is indicated by the numbers. For example, grey level 12 is displayed by turning on subfields 4 and 8, wherein the length of subfield 4 equals 4 LSB pulses and the length of subfield 8 equals 8 LSB pulses. Assuming no distance between the individual subfields, all LSB pulses or all subfields corresponding to the brightness resolution of the imaging device must fit into the time during which a pure primary colour is reproduced.

In order to display the lowest intensity white light, one LSB pulse of each primary colour is used. The lowest intensity white light may thus be composed using 1 LSB of red and 1 LSB of green and 1 LSB of blue.

Using the above mentioned definition the dynamic range is defined as $$DynamicRange = \frac{MaximumLight}{LSBLight} \quad (9)$$

For simplification, the light output is assumed to be linearly dependent on the time during which the light is projected, thus $$DynamicRange = \frac{t_{MAXLight}}{t_{LSB}} \quad (10)$$

In known displays the time during which pure primary colour light is reproduced is chosen to be as long as possible. The time for one LSB is depending on the time during which a pure primary colour is reproduced and the resolution in terms of bit depth n of the imaging device.

$$t_{LSB,COLOR\_X} = \frac{t_{pure,COLOR\_X}}{(2^n - 1)} \quad (11)$$

For the exemplary n=8-Bit system having a resolution of 255 LSB pulses the time for the LSB in each respective primary colour is:

$$t_{LSB,GREEN} = \frac{t_{PURE,GREEN}}{(2^n - 1)} = \frac{4.444 \text{ m sec}}{255} = 17.4 \text{ } \mu \text{sec} \quad (12)$$

$$t_{LSB,BLUE} = \frac{t_{PURE,BLUE}}{(2^n - 1)} = \frac{5.556 \text{ m sec}}{255} = 21.2 \text{ } \mu \text{sec} \quad (13)$$

$$t_{LSB,RED} = \frac{t_{PURE,RED}}{(2^n - 1)} = \frac{6.667 \text{ m sec}}{255} = 26.1 \text{ } \mu \text{sec} \quad (14)$$

White light that is added to increase the dynamic range may have a colour temperature that is different from the white light which is generated using the pure primary colours. The different colour temperatures may be compensated for, though at the cost of reduced maximum brightness and dynamic range. For simplification purposes it is assumed that the colour temperatures of white light produced either by using the pure primary colour light or the spoke light are equal.

Using the exemplary display system and colour wheel with a spoke angle of $\phi_{SPOKE}=10°$, the increase in dynamic range when using the spoke light may be expressed as additional time during which light is reproduced. The units for the additional light are shown as multiples of the LSB time for each respective colour.

$$t_{SPOKE} = \frac{\varphi_{SPOKE}}{360°} \cdot \frac{1}{f_v} = \frac{2 \cdot 10°}{360°} \cdot \frac{1}{50 \text{ Hz}} = 0.5555 \text{ m sec} \quad (15)$$

The number of additional levels L, or LSBs, for each colour calculates as $$L_{SPOKE,GREEN} = \frac{2 \cdot t_{SPOKE}}{t_{LSB,GREEN}} = \frac{1.111 \text{ m sec}}{14.4 \text{ } \mu \text{sec}} = 63.8 \quad (16)$$

$$L_{SPOKE,BLUE} = \frac{2 \cdot t_{SPOKE}}{t_{LSB,BLUE}} = \frac{1.111 \text{ m sec}}{21.2 \text{ } \mu \text{sec}} = 52.4 \quad (17)$$

$$L_{SPOKE,RED} = \frac{2 \cdot t_{SPOKE}}{t_{LSB,RED}} = \frac{1.111 \text{ m sec}}{26.1 \text{ } \mu \text{sec}} = 42.6 \quad (18)$$

One simple way of compensation for different colour temperatures is to reduce the pure colour time of blue by [blue levels−red levels]=52−43=9 LSB and green by [green levels−red levels]=64−43=21 LSB for display of white image content. The dynamic range is then determined by the colour having the longest LSB pulse duration, which in the example is red. The increased dynamic range with $L_{PURE\_COLOUR}=255$ calculates as $(L_{PURE\_COLOUR}+L_{SPOKE,RED}):1=(255+43):1=298:1$, which corresponds to a 8,22 bit display system.

In current systems the relationship between the time during which pure primary colours are reproduced and the time during which secondary colours are reproduced is optimised for reproduction of a maximum number of colours. However, there is a need for sequential colour display systems that have a further extended dynamic range with regard to the brightness level using the available imaging systems.

The inventive method for driving a display system according to claim 1 offers the desired improved dynamic range. Advantageous developments are presented in the subclaims. The present invention achieves an increased dynamic range by an improved balancing between spoke light and non-spoke light for reproducing images. For this purpose, the time during which spoke light is projected onto the imaging device is adjusted to be as long as possible. In the inventive display system, the LSB pulse length is selected to be as short as physically possible, thereby reducing the minimum brightness level that can be reproduced. Further, the area of the colour wheel that is used for reproducing spoke light is increased, i.e. the spoke angle is increased.

In one embodiment of the invention this is achieved by adapting the optical means which integrate the light passed through the colour wheel. For a given size of the colour wheel the aperture of the light spot projected onto the colour wheel is increased. Increasing the light spot, or the aperture, additionally increases the maximum peak light output.

In another development, the optical means are arranged such that they allow for selecting between two different locations of the light spot on the colour wheel or between two different sizes of the light spot. The selection may be achieved by, e.g. selectively inserting corresponding lenses or mirrors, or changing the focus of an optical integrator, or radially shifting the light spot across the colour wheel.

In yet another embodiment the aperture remains the same and additional spoke light is generated by additionally using pure colour light before and after the actual spoke physically enters into the light beam. The pure colour light generated before entering the actual spoke and after leaving the actual spoke is integrated in the human visual system to light that substantially has the colour of the respective actual spoke.

In the aforementioned cases, the additional spoke light is used to increase the maximum white brightness and/or to decrease the level of the minimal possible brightness.

In a development, the imaging device is switchable between 50 Hz and 60 Hz modes in order to accommodate different video standards. Driving schemes are stored for each respective video standard which take the different speeds of the colour wheel into account. Since the individual LSB times are 20% longer in the 50 Hz video modes the beneficial effect of the invention in this mode is larger compared to the 60 Hz video modes.

In equation (9) the relationship between dynamic range and minimum non-zero brightness level, which appears as LSB, is shown. According to the invention the minimum light is optimised by using a PWM pulse which is as short as possible for reproducing the LSB. As an exemplary value 10 μsec are assumed to be the shortest possible LSB pulse length. Referring back to the exemplary display system, the ratio between the primary colours blue, green and red is 50:40:60. The green colour segment is the smallest, i.e. pure green colour is reproduced for the shortest time. Thus, the available resolution of 8 bit or 255 brightness levels has to be matched into the total time for the green segment. By definition, $t_{LSB, GREEN}$ is 10 μsec. Since the angular speed of the colour wheel is set to match the available resolution into the smallest segment, i.e., the green segment, the LSB times for the other primary colours differ. They calculate as $$t_{LSB,BLUE} = t_{LSB,GREEN} \cdot \frac{\varphi_{PURE,BLUE}}{\varphi_{PURE,GREEN}} \quad (19)$$
$$= 10 \sec \cdot \frac{50°}{40°}$$
$$= 12.5 \, \mu\sec$$

and $$t_{LSB,RED} = t_{LSB,GREEN} \cdot \frac{\varphi_{PURE,RED}}{\varphi_{PURE,GREEN}} \quad (20)$$
$$= 10 \text{ n sec} \cdot \frac{60°}{40°}$$
$$= 15 \, \mu\sec$$

The LSB time may also be expressed as a corresponding LSB angle, i.e. the angle by which the colour wheel is turned within one LSB's duration.

$$\varphi_{LSB,GREEN} = \frac{t_{LSB,GREEN}}{t_{Wheelrotation}} \cdot 360° = \frac{10 \, \mu\sec}{\frac{1}{50\,Hz}} \cdot 360° = 0.18° \quad (21)$$

$$\varphi_{LSB,BLUE} = \frac{t_{LSB,BLUE}}{t_{Wheelrotation}} \cdot 360° = \frac{12.5 \, \mu\sec}{\frac{1}{50\,Hz}} \cdot 360° = 0.225° \quad (22)$$

$$\varphi_{LSB,RED} = \frac{t_{LSB,RED}}{t_{Wheelrotation}} \cdot 360° = \frac{15 \, \mu\sec}{\frac{1}{50\,Hz}} \cdot 360° = 0.27° \quad (23)$$

For the 8-bit display system the active segment size can be expressed as a function of angular size in terms of LSB and the number of available levels, which is 255:

$$\phi_{PURE,GREEN} = 255 \cdot \phi_{LSB,GREEN} = 255 \cdot 0.18° = 45.9° \quad (24)$$

$$\phi_{PURE,BLUE} = 255 \cdot \phi_{LSB,BLUE} = 255 \cdot 0.225° = 57.38° \quad (25)$$

$$\phi_{PURE,RED} = 255 \cdot \phi_{LSB,RED} = 255 \cdot 0.27° = 68.85° \quad (26)$$

In order not to change the optical system of the display the size of the segments in the colour wheel shall not be changed. However, the spoke size is increased. The spoke part of each individual segment is:

$$\phi_{SPOKE,GREEN} = \phi_{SEGMENT,GREEN} - \phi_{PURE,GREEN} = 2 \cdot 50° - 45.9° = 54.1° \quad (27)$$

$$\phi_{SPOKE,BLUE} = \phi_{SEGMENT,BLUE} - \phi_{PURE,BLUE} = 2 \cdot 60° - 57.38° = 62.62° \quad (28)$$

$$\phi_{SPOKE,RED} = \phi_{SEGMENT,RED} - \phi_{PURE,RED} = 2 \cdot 70° - 68.85° = 71.15° \quad (29)$$

The total size of all spokes added is then $$\phi_{SPOKE,TOTAL} = \phi_{SPOKE,RED} + \phi_{SPOKE,BLUE} + \phi_{SPOKE,GREEN} = 71.15° + 62.62° + 54.1° = 187.86° \quad (30)$$

In an embodiment in which the actual spoke size exactly matches the optical or physical spoke size, the minimum distance from pure segment boundary to the physical segment boundary must be maintained. It is assumed that the spoke size is the same for all spokes. Therefore, the spoke size is now derived from the smallest spoke dimension of a primary colour given above. In the given example this is $\phi_{SPOKE, GREEN}$. In a 6 segment colour wheel (N=2) the distance $\phi_{SPOKE,GREEN}/(2*N)$ separates the pure colour from the physical segment boundary on either side.

For simplification of the driving scheme the spoke size is chosen to be equal for all spokes.

For the exemplary embodiment the spokes are evenly distributed among the pure colour segment boundaries. In the above mentioned exemplary embodiment, the resulting size of one single spoke can then be expressed as $\phi_{SPOKE, MAGENTA} = \phi_{SPOKE,CYAN} = \phi_{SPOKE,YELLOW} = 2*\phi_{SPPOKE,GREEN}/(2*N)$.

$$\varphi_{MAGENTA} = \varphi_{CYAN} = \varphi_{YELLOW} = \frac{54.1°}{2} = 27.05° \quad (31)$$

In the above mentioned exemplary embodiment there are two similar sets of segments which results in two similar sets of spokes. Therefore, for further calculations we chose the double-spokes:

$$\phi_{2SPOKE} = 2*\phi_{SPOKE,MAGENTA} = 2*\phi_{SPOKE,CYAN} = 2*\phi_{SPOKE,YELLOW}$$

The additional brightness levels L for displaying white light are thus:

$$L_{SPOKE,GREEN} = \frac{\varphi_{2SPOKE}}{\varphi_{LSB,GREEN}} = \frac{54.1°}{0.18°} = 300 \quad (32)$$

$$L_{SPOKE,BLUE} = \frac{\varphi_{2SPOKE}}{\varphi_{LSB,BLUE}} = \frac{54.1°}{0.225°} = 240 \quad (33)$$

$$L_{SPOKE,RED} = \frac{\varphi_{2SPOKE}}{\varphi_{LSB,RED}} = \frac{54.1°}{0.27°} = 200 \quad (34)$$

As discussed before, the gain in dynamic range expressed in multiples of the smallest brightness level is determined by the colour having longest LSB pulse length, which is red in the example. The resulting number of brightness levels is $255+L_{SPOKE,RED}=255+200=455$. 455 levels of brightness correspond to a 8.83 bit resolution.

Due to the change of the spoke light/non spoke light relationship, for the blue and red segment some time remains that is not used in this solution:

$$\phi_{rem\_RED} = \phi_{SPOKE,RED} - \phi_{SPOKE,GREEN} = 71.15° - 54.1° = 17.05°$$

$$\phi_{rem\_BLUE} = \phi_{SPOKE,BLUE} - \phi_{SPOKE,GREEN} = 62.62° - 54.1° = 8.52°$$

The colour wheel should therefore be redesigned finding a better balance of the primaries segments, increasing green segment size for at the expense of red and blue. That measure would further increase the maximum brightness.

In another embodiment the spoke size is chosen not to be equal for all spokes. This is possible only if the physical spoke size is smaller than the spoke size that is implemented by the driving scheme. If, e.g., the calculated spoke sizes of formulae (27), (28), and (29) of pure colour segments are divided into two parts and distributed among the neighbouring spokes the following exemplary spoke sizes result:

$$\varphi_{SPOKE,MAGENTA} = \frac{\varphi_{SPOKE,RED} + \varphi_{SPOKE,BLUE}}{2} \quad (35)$$
$$= \frac{35.57° + 31.31°}{2}$$
$$= 33.44$$

$$\varphi_{SPOKE,CYAN} = \frac{\varphi_{SPOKE,GREEN} + \varphi_{SPOKE,BLUE}}{2} \quad (36)$$
$$= \frac{27.05° + 31.31°}{2}$$
$$= 29.18$$

$$\varphi_{SPOKE,YELLOW} = \frac{\varphi_{SPOKE,RED} + \varphi_{SPOKE,GREEN}}{2} \quad (37)$$
$$= \frac{35.57° + 27.05°}{2}$$
$$= 31.31$$

The summed total size of the spokes equals the total size calculated before (cf. equation 30):

$$\varphi_{SPOKE,TOTAL} = \varphi_{SPOKE,MAGENTA} + \varphi_{SPOKE,CYAN} + \varphi_{SPOKE,YELLOW} \quad (38)$$
$$= 2 \cdot 33.44° + 2 \cdot 29.18° + 2 \cdot 31.31°$$
$$= 187.86°$$

For this embodiment it is also advantageous to have equally sized spokes. A common spoke size of $$\varphi_{SPOKE} = \frac{\varphi_{SPOKE,TOTAL}}{6} = \frac{187.86°}{6} = 31.31° \quad (39)$$

is therefore chosen for the exemplary colour wheel with 6 spokes.

Creating equal spoke sizes is done by "adjusting" the position of $\phi_{PURE,BLUE}$ towards the magenta spoke. The yellow spoke happens to have the right size in this example. 'Adjusting' is done by temporally shifting the onset of the illumination closer to the respective spoke.

Special care must be taken that the distance from one pure segment boundary to the physical filter segment boundary is not getting smaller than half of the physical spoke size. In the above mentioned exemplary embodiment this has been considered.

The additional brightness levels L are calculated using the values for $\phi_{SPOKE,RED}$, $\phi_{SPOKE,GREEN}$, $\phi_{SPOKE,BLUE}$:

$$L_{SPOKE,GREEN} = \frac{2 \cdot \varphi_{SPOKE,GREEN}}{\varphi_{LSB,GREEN}} = \frac{2 \cdot 27.05°}{0.18°} = 300 \quad (40)$$

$$L_{SPOKE,BLUE} = \frac{2 \cdot \varphi_{SPOKE,BLUE}}{\varphi_{LSB,BLUE}} = \frac{2 \cdot 31.31°}{0.225°} = 278 \quad (41)$$

$$L_{SPOKE,RED} = \frac{2 \cdot \varphi_{SPOKE,RED}}{\varphi_{LSB,RED}} = \frac{2 \cdot 35.57°}{0.27°} = 263 \quad (42)$$

The resulting number of available brightness levels is 255+$L_{SPOKE,RED}$=255+263=518. 518 different brightness levels correspond to a resolution of 9.02 bit.

A further improvement of the resolution may be achieved by a redesign of the colour wheel, using a larger red segment and a smaller green segment.

The invention will be described in the following with reference to the drawing. In the drawing FIG. 1 shows a prior art six-segment colour wheel;

In the drawing, same or similar elements are referenced by the same reference symbols.

Figure 1:
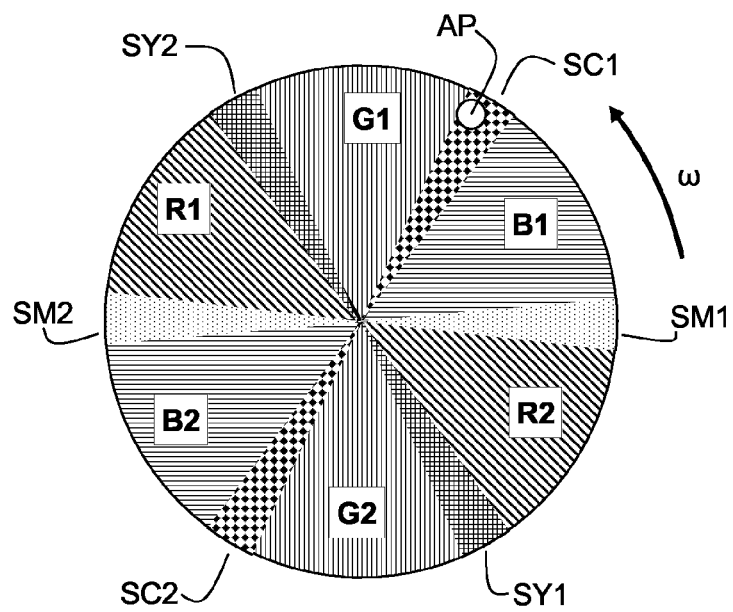
Figure 2:
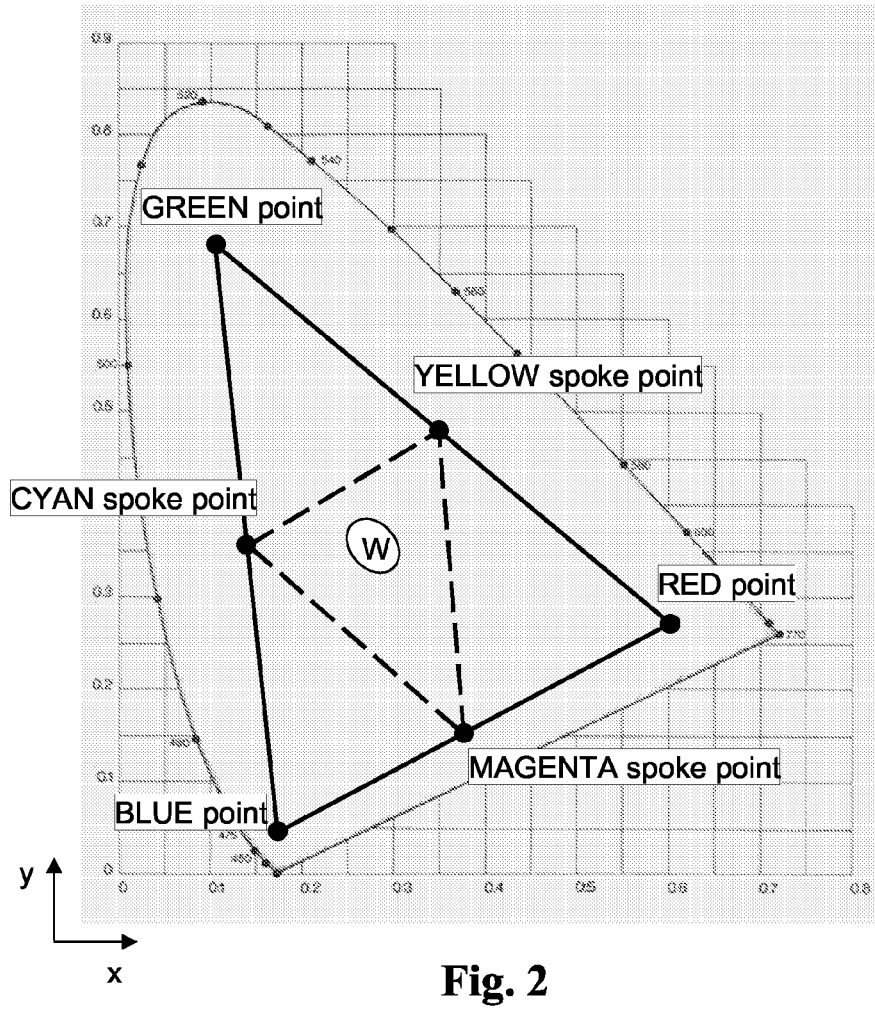
FIG. 2 is a 1931 C.I.E. colour diagram showing the colour space for primary and secondary colours.
Figure 3:
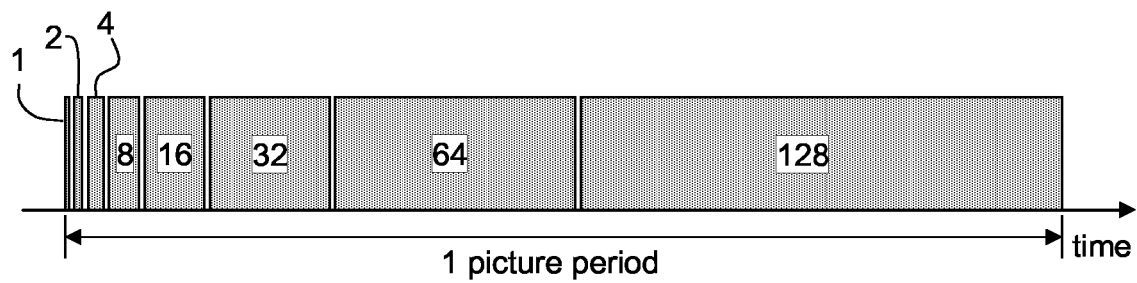
FIG. 3 illustrates an exemplary distribution of LSB light pulses grouped in sub-fields.

FIGS. 1 to 3 have already been described above and are, therefore not referenced to in detail again.

Figure 4:
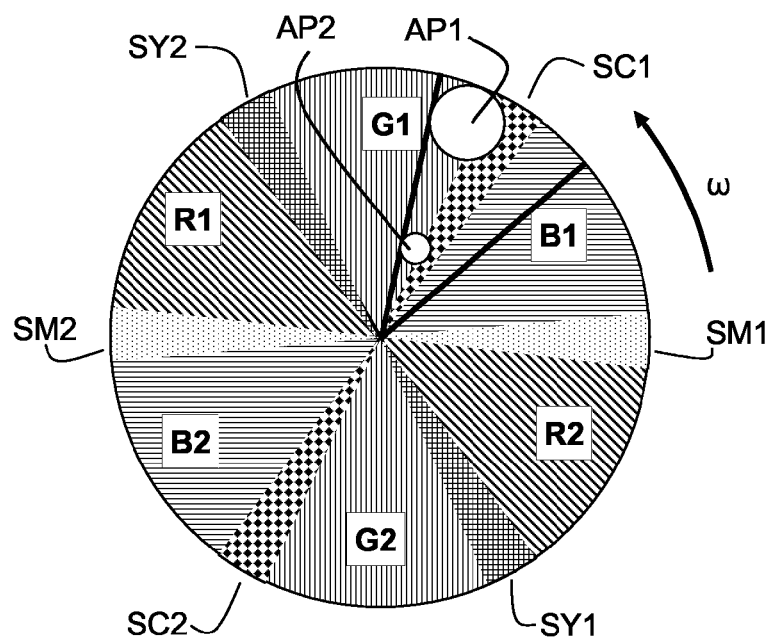
FIG. 4 shows a colour wheel with a exemplarily enlarged spoke according to the invention.

FIG. 4 shows a colour wheel with an enlarged spoke according to the invention, when compared to the spoke of FIG. 1. For comparison purposes the areas representing the original spokes from FIG. 1 are kept identical. In reality, the spokes are not physically present, but are created through mixing of the light from the neighbouring pure primary colour segments in the optical system, e.g. in a light integrator. Thus in reality the spokes have twice the width as the light spot, symmetrically to the actual physical border of the colour filter segments. Light spot AP1 corresponds to an increased aperture of the optical means. The increased width of the spoke is indicated by the bold solid lines extending from the centre of the colour wheel to the outer rim, enclosing the light spots AP1 and AP2. The light spot AP2 has the same size as the light spot AP from FIG. 1. However, it is relocated closer to the centre of the colour wheel, thus achieving the same relative enlargement of the spoke. The angle of the spokes that are created by the light spots AP1 and AP2 is the same in both cases.

The spokes may be enlarged by actually enlarging the light spot projected onto the colour wheel, or by shifting a light spot of unchanged size closer to the middle of the colour wheel. In terms of the time that each colour is reproduced or in terms of the angle that is covered by the spoke this changes the spoke size relative to the pure colour segment's size. Enlarging of the spokes may also be made switchable, allowing the user to select between improved colour reproduction at lower maximum brightness level and improved dynamic range at possible smaller colour gamut for higher brightness levels. The optical system of the display system may thus provide means for altering the aperture of the light integrator or for changing the position of the centre of the colour wheel relative to the light spot.

Physically changing the aperture or the position of the light spot is, one possible embodiment of the invention. In another embodiment of the invention, the angle that is covered by a spoke can also be enlarged by adding pure colours at the onset and at the end of the spoke. The secondary colour is integrated by the human visual system into the respective secondary colour. The integration includes the pure colours as well as the pure colours that are reproduced during the spoke period.

Mechanically altering the aperture of the light spot, however, results in a higher light efficiency of the optical system.

Figure 5:
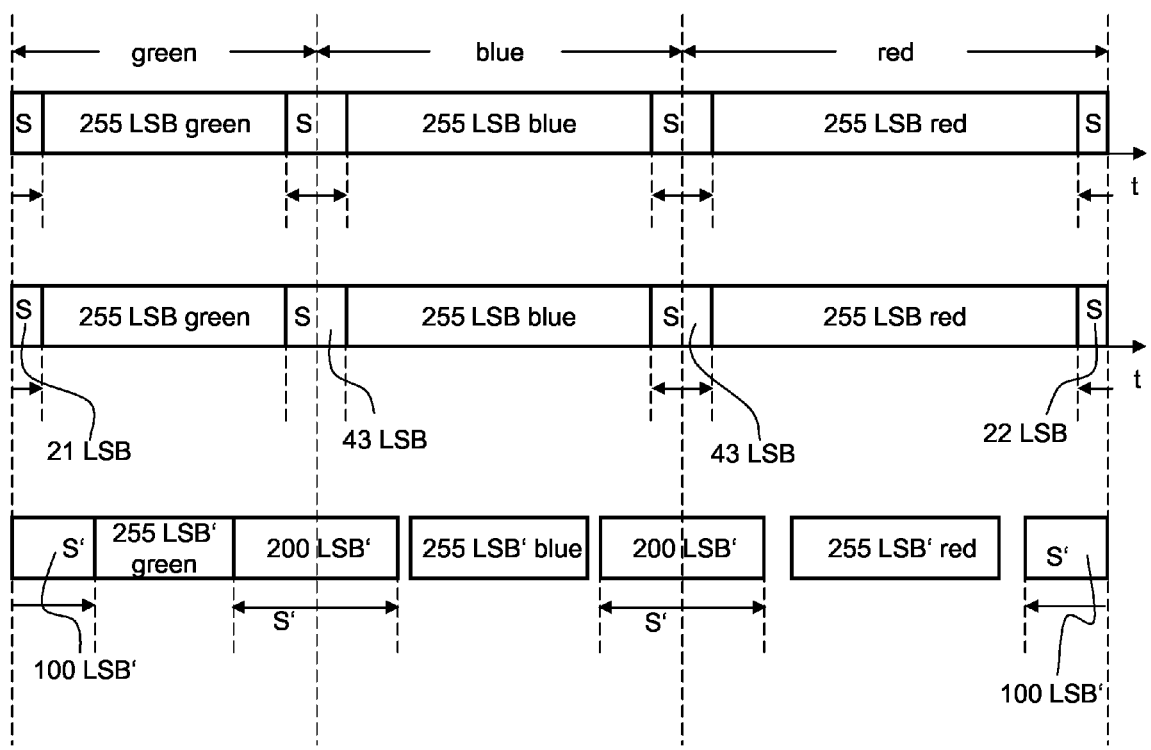
FIG. 5 illustrates the distribution of the LSB pulses across the colour wheel.

In FIG. 5 the distribution of the LSB pulses over the colour wheel for half a revolution is illustrated. The segment size of the individual primary colour segments corresponds to the segment size of the exemplary embodiment used further above. The borders of the segments are indicated by the dashed vertical lines. The respective colours are indicated on top of the figure. In the top row, the situation in a sequential colour display system according to the state of the art is shown. The display system is an 8 bit system, and the 255 possible brightness levels are evenly distributed inside the regions that allow pure colour reproduction. The spokes between the parts of the segments producing pure primary colours are not used. In the middle row the spokes are used for white boosting, as it is known from the prior art. However, the total number of additional LSB pulses is rather small. At the extreme left and right edges of the figure, only half of the LSB pulses are shown, since it is assumed that the spokes are located symmetrically to the border of the colour wheel's segments. In the lower row of the figure the distribution of the LSB' pulses in a display system according to the invention is shown. The LSB' pulses for one colour are selected to be as short as possible for the imaging device. The length of the LSB' pulses for the other individual primary colours is adapted to match the relative share of the individual primary colours in the colour wheel. This allows for the spoke S' to be larger, as is shown in the figure. The enlarged spokes S' each hold a larger number of LSB' pulses than the original spokes S hold LSB pulses. This increases the total number of pulses available to display different brightness levels. The gaps between the spokes S' and some of the pure primary colours indicate that the size of the spoke S' was selected to be equal for all segments. The illustration in this figure applies for both, physically and 'virtually' changing the spoke size, wherein 'virtually' changing the spoke size is effected through accordingly altering the driving scheme, as elucidated in more detail above. By changing the onset and the end of the spoke with respect to the physical border between two colour filter segments, i.e., by shifting the spoke in time, the hue of the secondary colour may be altered. Also, this allows for making the size of all spokes equal, while utilising the colour wheel for the maximum possible time.

Throughout this specification the term colour wheel is used as a synonym for all arrangements in which a multiplicity of colour filters is sequentially brought into a light path between a multispectral light source and an imaging device. The invention is thus covering other filter arrangements such as barrel-shaped colour filters, filter arrangements with a polygonal cross section, belt-type filter arrangements or the like. The invention is suitable for all types of colour filters, i.e., translucent or reflective. Further, the invention is not limited to six-segment colour filter arrangements, but may be used with any number of filters.

The inventive driving method may be used in any display device that uses a colour wheel, such as TV or data projectors, either in a configuration as rear or front projection device.

The invention claimed is:

1. Method for reproducing colour images by sequentially reproducing monochromatic images, wherein monochromatic primary colour images are reproduced by projecting respective filtered multispectral light onto an imaging device, wherein the multispectral light is projected onto a colour filter arrangement via optical means that are arranged in the light path, wherein in a sequence of changeable filters of the colour filter arrangement a transition between two neighboured colour filters produces light of a secondary colour, and wherein different brightness values are achieved by the imaging device passing on light to a screen as a number of light pulses of a corresponding duration, wherein, for a first primary colour, which has the smallest share in the colour filter arrangement, the minimum pulse duration is selected to be as short as physically possible with respect to the switching speed of the imaging device, that the minimum pulse durations for the other primary colours are adjusted according to the ratio of the share of the respective colour filter segments in the total colour filter arrangement, that the time during which a secondary colour is reproduced during a transition between two monochromatic primary colour filters is selected to essentially fully extend between the end of the reproduction of the preceding primary colour and the beginning of the reproduction of the subsequent primary colour, that the light projected onto the screen during the transitions between neighbouring colour filters is used for increasing the maximum light output, and that the minimum pulse duration for projecting light during the transition between neighbouring colour filters is selected to be essentially the same as the minimum pulse duration for the first primary colour, whereby the dynamic range of the display is increased.

2. The method of claim 1, wherein the time during which a secondary colour is reproduced is increased by accordingly increasing the aperture of the optical means in the light path.

3. The method of claim 1, wherein, if the changeable filter arrangement is a rotating disc-like filter arrangement, the time during which a secondary colour is reproduced is increased by radially displacing the aperture spot of the optical means with regard to the centre of the disc-like filter arrangement.

4. The method of claim 1, wherein the time during which a secondary colour is reproduced is increased by adding respective shares of primary colour light before the onset and after the end of a transition which produces secondary colour light.

5. The method of claim 4, wherein the hue of the secondary colour light can be modified by adding accordingly balanced amounts of primary colour light before the onset and after the end of a transition which produces secondary colour light.

* * * * *